United States Patent
Wu et al.

(10) Patent No.: US 9,904,338 B2
(45) Date of Patent: Feb. 27, 2018

(54) CONTROL CHIP, CONTROL METHOD AND CONNECTION DEVICE UTILIZING THE SAME

(71) Applicant: Nuvoton Technology Corporation, Hsinchu Science Park (TW)

(72) Inventors: Chun-Yi Wu, New Taipei (TW); Ping-Ying Chu, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 944 days.

(21) Appl. No.: 14/292,449

(22) Filed: May 30, 2014

(65) Prior Publication Data
US 2015/0214734 A1    Jul. 30, 2015

(30) Foreign Application Priority Data
Jan. 27, 2014   (TW) .............................. 103103065 A (51) Int. Cl.
*G06F 1/26* (2006.01)

(52) U.S. Cl.
CPC ............. *G06F 1/26* (2013.01); *Y10T 307/696* (2015.04)

(58) Field of Classification Search
CPC ........ H02J 2007/006; H02J 2007/0062; G06F 13/40–13/4045; G06F 13/10–13/128; G06F 2213/40; G06F 2213/4002; G06F 2213/4004
USPC ........................ 307/80; 710/62–65, 305–317
See application file for complete search history.

(56) References Cited

U.S. PATENT DOCUMENTS

| | | | | |
|---|---|---|---|---|
| 2001/0032280 A1* | 10/2001 | Osakada | ............. | G06F 13/4022 710/305 |
| 2007/0180181 A1* | 8/2007 | Chen | ..................... | G06F 13/426 710/313 |
| 2007/0245058 A1* | 10/2007 | Wurzburg | ........... | G06F 13/4022 710/313 |
| 2008/0220623 A1* | 9/2008 | Young | .................... | H01R 29/00 439/47 |
| 2011/0018522 A1* | 1/2011 | Li | ........................ | H02J 7/0052 323/318 |

(Continued)

FOREIGN PATENT DOCUMENTS

CN    201122770 Y    9/2008
CN    102841876 A   12/2012

*Primary Examiner* — Rexford Barnie
*Assistant Examiner* — Thai Tran
(74) *Attorney, Agent, or Firm* — Muncy, Geissler, Olds & Lowe, P.C.

(57) ABSTRACT

A connection device including a first connection port, a second connection port, a third connection port and a chip is provided. When a host device is coupled to the first connection port and an electronic device is coupled to the second connection port, the connection device sets the level of an identification pin of the second connection port to a high level such that the electronic device operates in a device mode. In the device mode, the host device provides power to the electronic device. When the electronic device is coupled to the second connection port and a peripheral device is coupled to the third connection port, the connection device sets the level of the identification pin to a low level such that the electronic device operates in a host mode. In the host mode, the electronic device provides power to the peripheral device.

20 Claims, 11 Drawing Sheets

(56) References Cited

U.S. PATENT DOCUMENTS

| | | | |
|---|---|---|---|
| 2012/0290761 A1 | 11/2012 | Chen et al. | |
| 2012/0295473 A1 | 11/2012 | Chen | |
| 2012/0317325 A1* | 12/2012 | Zhang | H04M 1/72527 710/301 |
| 2013/0304961 A1* | 11/2013 | Lin | G06F 13/409 710/313 |
| 2014/0026001 A1 | 1/2014 | Lin | |

* cited by examiner

CONTROL CHIP, CONTROL METHOD AND CONNECTION DEVICE UTILIZING THE SAME

CROSS REFERENCE TO RELATED APPLICATIONS

This application claims priority of Taiwan Patent Application No. 103103065, filed on Jan. 27, 2014, the entirety of which is incorporated by reference herein.

BACKGROUND OF THE INVENTION

Field of the Invention

The invention relates to a connection device, and more particularly to a connection device which is capable of connecting a host device, an electronic device and a peripheral device simultaneously.

Description of the Related Art

In present USB transmittal technology, a connection line is utilized to transmit data between a host device and an electronic device. The conventional connection line includes two terminals. One terminal is a USB standard type-A plug port and another terminal is a USB micro-B plug port. If the electronic device desires to communicate with a peripheral device, another connection line is utilized. One terminal of the other connection line is a USB micro-B plug port and another terminal of the other connection line is a USB standard type-A jack port. Since the two connection lines cannot share among the host device, the electronic device and the peripheral device, a user must buy many connection lines and carry the lines to connect devices.

BRIEF SUMMARY OF THE INVENTION

In accordance with an embodiment, a control chip includes a plurality of first pins, a plurality of second pins, a plurality of third pins, a level detection unit, a determining unit and a control unit. The first pins are coupled to a host device via a first connection port. The second pins are coupled to an electronic device via a second connection port. The third pins are coupled to a peripheral device via a third connection port. The level detection unit detects the first and second pins to generate a first detection result. The determining unit determines whether a portion of the first and second pins transmit data to generate a determination result. The control unit adjusts a level of a specific pin among the first and second pins according to the first detection result and the determination result.

An exemplary embodiment of a control method for a connection device including a first connection port coupled to a host device, a second connection port coupled to an electronic device and a third connection port coupled to a peripheral device is described in the following. Power pins of the first and second connection ports are detected to generate a detection result. It is determined whether the second connection port transmits data to generate a determination result. An identification pin of the second connection port is adjusted according to the detection result and the determination result.

In accordance with another embodiment, a connection device includes a first connection port, a second connection port, a third connection port and a control chip. The first connection port is configured to couple to a host device. The second connection port is configured to couple to an electronic device. The third connection port is configured to couple to a peripheral device. The control chip includes a plurality of first pins, a plurality of second pins, a plurality of third pins, a level detection unit, a determining unit and a control unit. The first pins are coupled to the first connection port. The second pins are coupled to the second connection port. The third pins are coupled to the third connection port. The level detection unit detects the first and second pins to generate a first detection result. The determining unit determines whether the second connection port is coupled to the second pins to generate a determination result. The control unit adjusts a level of a specific pin among the second pins according to the first detection result and the determination result.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Figure 1A:
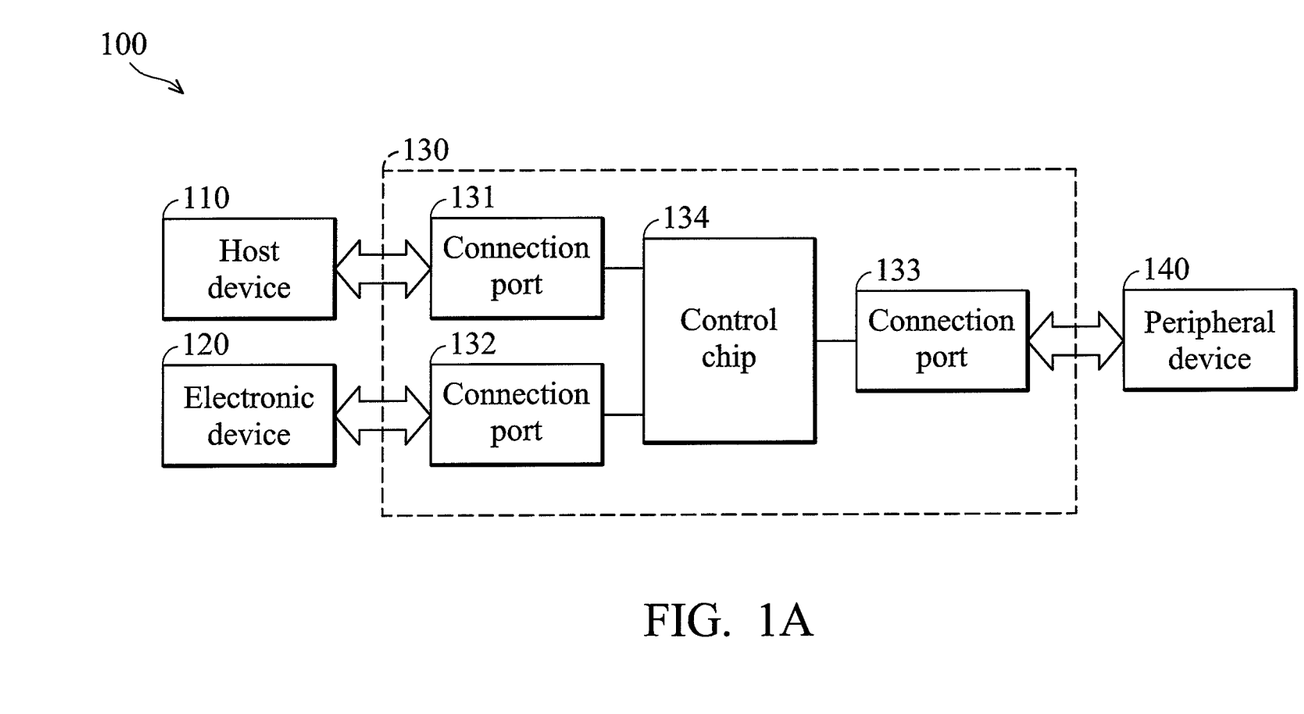
FIGS. 1A and 1B are schematic diagrams of exemplary embodiments of a transmittal system, in accordance with some embodiments.

FIG. 1A is a schematic diagram of an exemplary embodiment of a transmittal system, in accordance with some embodiments. The transmittal system 100 includes a host device 110, an electronic device 120, a connection device 130 and a peripheral device 140. The host device 110 can be any device with data processing functions, such as a computer. Additionally, the invention does not limit the kinds of electronic device 120 and peripheral device 140. In one embodiment, the electronic device 120 is a mobile electronic device, such as a mobile phone or a tablet PC. In some embodiments, the peripheral device 140 is a USB device, such as a flash drive or a mouse.

In this embodiment, the connection device 130 includes connection ports 131~133 and a control chip 134. The connection port 131 is configured to couple to the host device 110. The connection port 132 is configured to couple to the electronic device 120. The connection port 133 is configured to couple to the peripheral device 140. The control chip 134 transmits data and power among the connection ports 131~133. The invention does not limit the kinds of connection ports 131~133. In one embodiment, the connection ports 131~133 are USB ports. The connection ports 131 and 133 are USB type-A ports. The connection port 132 is a USB micro-A port or a USB micro-B port.

Figure 1B:
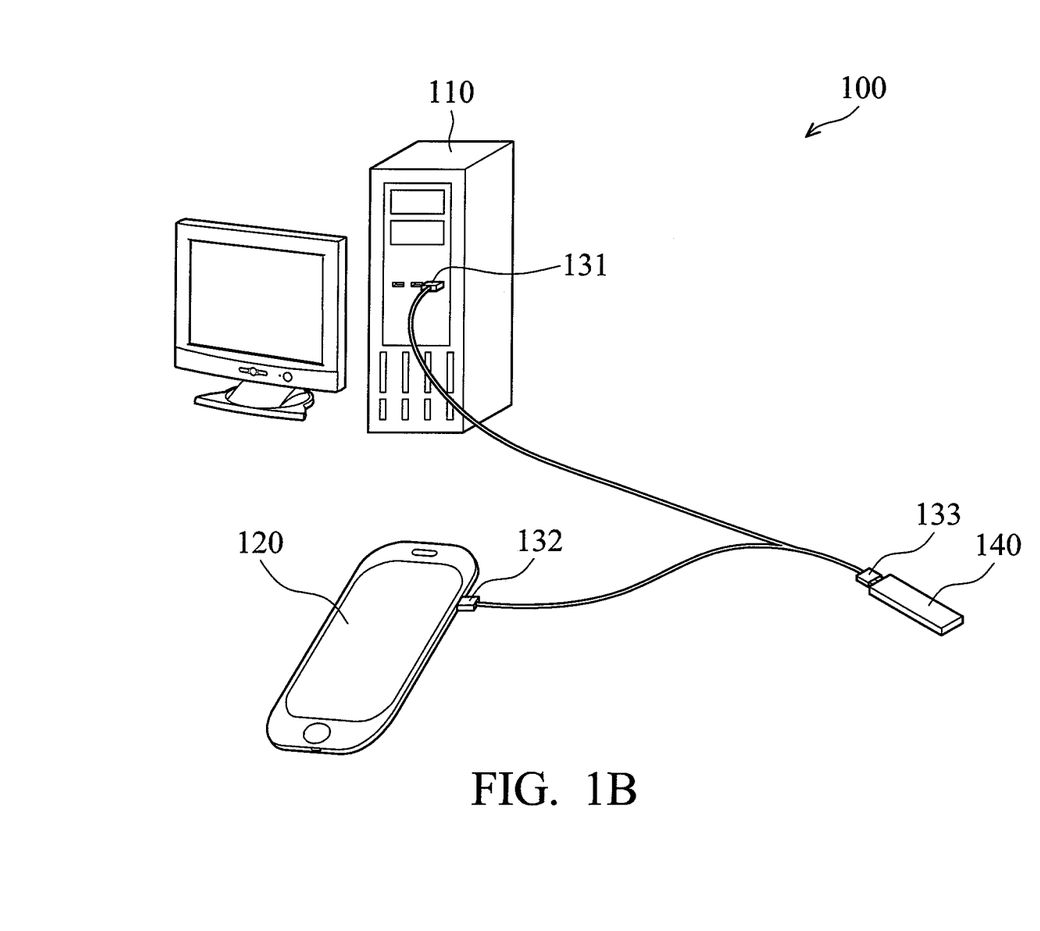

The invention does not limit the type of connection device 130. As shown in FIG. 1A, the connection device 130 is an adapter board. In FIG. 1B, the connection device 130 is a cable having three ends to connect to the host device 110, the electronic device 120 and the peripheral device 140. A user utilizes the host device 110 to charge the electronic device 120 or the peripheral device 140 via a single cable or a single board. In another embodiment, when the electronic device 120 has an On The Go (OTG) function, the connection device 130 sets the operation mode of the electronic device 120 according to the connection state of the connection ports 131~132.

For example, when the host device 110 is coupled to the connection port 131 and the electronic device 120 is coupled to the connection port 132, the connection device 130 sets the level of an identification pin of the connection port 132. In one embodiment, the connection device 130 sets the level of the identification pin of the connection port 132 to a high level such that the electronic device 120 operates in a device mode. In the device mode, the electronic device 120 is controlled by the host device 110 and receives power provided by the host device 110.

When the electronic device 120 is coupled to the connection port 132 and the peripheral device 140 is coupled to the connection port 133, the connection device 130 sets the level of the identification pin of the connection port 132. In one embodiment, the connection device 130 adjusts the level of the identification pin of the connection port 132 to a low level. Therefore, the electronic device 120 operates in a host mode. In the host mode, the electronic device 120 controls and provides power to the peripheral device 140.

In other embodiments, when the host device 110 and the peripheral device 140 are coupled to the connection device 130, since the electronic device 120 is not coupled to the connection device 130, the connection device 130 sets or does not set the level of the identification pin of the connection port 132. At this time, the peripheral device 140 is controlled by the host device 110 and receives the power provided by the host device 110.

Furthermore, when the host device 110 is coupled to the connection port 131, the electronic device 120 is coupled to the connection port 132 and the peripheral device 140 is coupled to the connection port 133, the control chip 134 provides communication between the host device 110 and the electronic device 120, between the electronic device 120 and the peripheral device 140 or between the host device 110 and the peripheral device 140 according to a pre-determined value. The invention does not limit the generation of the pre-determined value. In one embodiment, the pre-determined value is set by a user. For example, the connection device 130 includes a mechanical switch or a digital switch. The user adjusts the state of the mechanical switch or the digital switch to set the pre-determined value. In another embodiment, the pre-determined value is pre-determined by a designer and stored in the connection device 130.

Figure 2A:
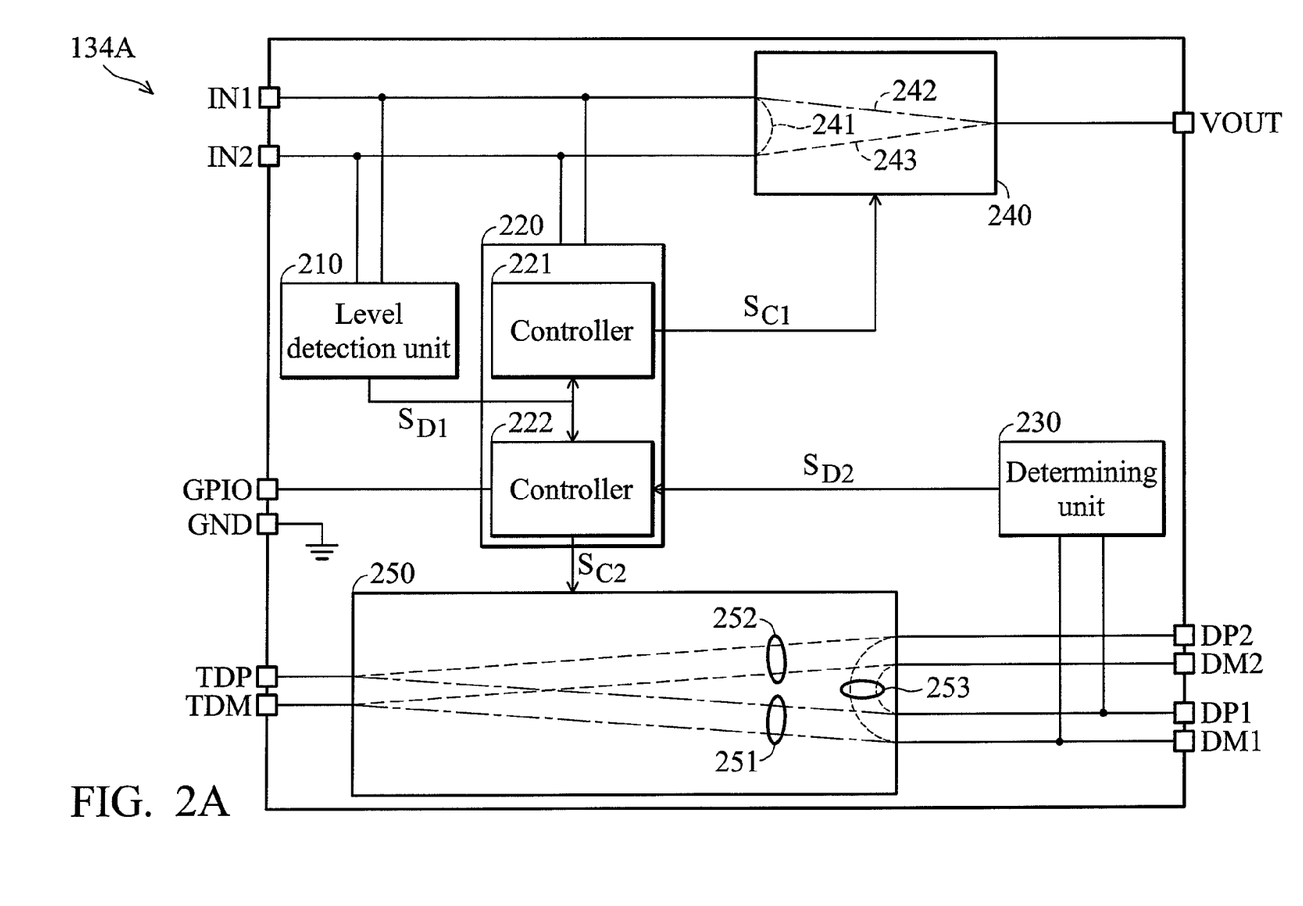
FIGS. 2A-2C are schematic diagrams of exemplary embodiments of a control chip, in accordance with some embodiments.

FIG. 2A is a schematic diagram of an exemplary embodiment of a control chip, in accordance with some embodiments. Refer to FIGS. 1A and 2A, the control chip 134A includes various pins. The pins IN1, IN2, VOUT and GND are power pins to receive operation power. The pins IN1, IN2 and VOUT receive high operation power and the pin GND receives low operation power. The pins TDP, TDM, DP1, DM1, DP2 and DM2 are data pins to transmit data. The GPIO is an input/output pin. In this embodiment, the pins IN1, GND, TDP and TDM are referred to as first pins to couple the connection port 131. The pins IN2, GND, DP1, DM1 and GPIO are referred to as second pins to couple to the connection port 132. The pins VOUT, GND, DP2 and DM2 are referred to as third pins to couple to the connection port 133. In one embodiment, the pin GND is a common pin for the connection ports 131~133.

As shown in FIG. 2A, the control chip 134A further includes a level detection unit 210, a control unit 220 and a determining unit 230. The level detection unit 210 detects the levels of the first and second pins to generate a detection result $S_{D1}$. In this embodiment, the level detection unit 210 determines whether the host device 110 is coupled to the connection port 131 and the electronic device 120 is coupled to the connection port 132 according to the levels of the pins IN1 and IN2. The invention does not limit the circuit structure of the level detection unit 210. Any structure can serve as the level detection unit 210, as long as the structure is capable of detecting levels.

The determining unit 230 determines whether the second pins transmit data. In this embodiment, the determining unit 230 determines whether the pins DP1 and DM1 transmit data according to the levels of the pins DP1 and DM to generate a determination result $S_{D2}$. The invention does not limit the circuit structure of the determining unit 230. Any circuit structure can serve as the determining unit 230, as long as the circuit structure is capable of determining the changes of the levels of the pins. In one embodiment, the determining unit 230 is a level detector.

The control unit 220 adjusts the level of a specific pin of the second pins according to the detection result $S_{D1}$ and the determination result $S_{D2}$ to control the operation mode of the electronic device 120. In this embodiment, the control unit 220 adjusts the level of the pin GPIO. Since the pin GPIO is coupled to the identification pin of the connection port 132, the control unit 220 adjusts the level of the pin GPIO to control the level of the identification pin of the connection port 132. For example, when the level of the identification pin of the connection port 132 is at the high level, the electronic device 120 operates in a device mode and is controlled by the host device 110. When the level of the identification pin of the connection port 132 is at the low level, the electronic device 120 operates in a host mode and controls the peripheral device 140.

In another embodiment, the control unit 220 is coupled to at least one of the pins IN1 and IN2 and operates according to the power on the pins IN1 and IN2. For example, when the host device 110 is coupled to the connection port 131, the control unit 220 receives power provided from the host device 110 via the pin IN1. When the electronic device 120 is coupled to the connection port 132, the control unit 220 receives the power provided from the electronic device 120 via the pin IN2. In some embodiments, the operation power of the control unit 220 is provided by other circuits.

The invention does not limit the internal structure of the control unit 220. In one embodiment, the control unit 220 includes at least one of the micro-processors, micro-controllers, memories and logic circuits. In this embodiment, the control unit 220 includes controllers 221 and 222 to generate control signals with an analog format and a digital format. The controller 221 receives the power provided from the pins IN1 and IN2 and generates the control signal $S_{C1}$ according to the detection result $S_{D1}$. The controller 222 receives the power provided by the pins IN1 and IN2 and generates the control signal $S_{C2}$ according to the detection result $S_{D1}$ and the determination result $S_{D2}$. In other embodiments, the control unit 220 only includes a single controller to generate control signals with an analog format or a digital format.

As shown in FIG. 2A, the control chip 134A further includes switch units 240 and 250 to transmit power and data. The switch unit 240 includes power transmittal paths 241~243. The switch unit 240 turns on one of the power transmittal paths 241~243 according to the control signal $S_{C1}$. The power transmittal path 241 is coupled between the pins IN1 and IN2. The power transmittal path 242 is coupled between the pins IN1 and VOUT. The power transmittal path 243 is coupled between the pins IN2 and VOUT. The switch unit 250 includes data transmittal paths 251~253. The switch unit 250 turns on one of the data transmittal paths 251~253 according to the control signal $S_{C2}$. The data transmittal path 251 is coupled to the pins TDP, TDM, DP1 and DM1. The data transmittal path 252 is coupled to the pins TDP, TDM, DP2 and DM2. The data transmittal path 253 is coupled to the pins DP1, DM1, DP2 and DM2. The control unit 220 generates the control signals $S_{C1}$ and $S_{C2}$ according to the detection result $S_{D1}$ and the determination result $S_{D2}$ to transmit data and power between the host device 110, the electronic device 120 and the peripheral device 140.

In one embodiment, when the level of the pin IN1 is higher than a pre-determined value, it means that the host device 110 is coupled to the connection port 131. At this time, if the level of the pin IN2 is higher than the pre-determined value or the pins DP1 and DM1 transmit data, it means that the electronic device 120 is coupled to the connection port 132. Therefore, the control unit 220 sets the level of the pin GPIO to a first level such that the electronic device 120 operates in a device mode and the control unit 220 enters a first operation mode. In the first operation mode, the control unit 220 turns on the paths 241 and 251. Therefore, the host device 110 charges the electronic device 120 via the path 241 and transmits data to the electronic device 120 via the path 251.

In a condition that the level of the pin IN1 is higher than the pre-determined value, when the level of the pin IN2 is not higher than the pre-determined value or when the pins DP1 and DM1 do not transmit data, it means that the host device 110 is coupled to the connection port 131 and the electronic device 120 is not coupled to the connection port 132. Therefore, the control unit 220 does not set the level of the pin GPIO. The level of the pin GPIO may be any level, such as a high level or a low level. At this time, the control unit 220 enters a second operation mode. In the second operation mode, the paths 242 and 252 are turned on. Therefore, when the peripheral device 140 is coupled to the connection port 133, the host device 110 can charge the peripheral device 140 via the path 242 and transmit data to the peripheral device 140 via the path 252.

When the level of the pin IN1 is not higher than the pre-determined value, if the level of the pin IN2 is higher than the pre-determined value or the pins DP1 and DM1 transmit data, it means the host device 110 is not coupled to the connection port 131 and the electronic device 120 is coupled to the connection port 132. Therefore, the control unit 220 sets the level of the pin GPIO to a second level such that the electronic device 120 enters a host mode. At this time, the control unit 220 enters a third operation mode. In one embodiment, the second level is lower than the first level. For example, the first level is a high level and the second level is a low level. In the third operation mode, the paths 243 and 253 are turned on. Therefore, when the peripheral device 140 is coupled to the connection port 133, the electronic device 120 charges the peripheral device 140 via the path 243 and transmits data to the peripheral device 140 via the path 253.

In other embodiments, during an initial period, the control unit 220 utilizes the control signals $S_{C1}$ and $S_{C2}$ to turn off the paths 241~243 and 251~253. After a period of time, all elements and signals are stable. At this time, the control unit 220 generates the corresponding control signals $S_{C1}$ and $S_{C2}$, according to the detection result $S_{D1}$ and the determination result $S_{D2}$. Additionally, the control unit 220 sets the level of the pin GPIO to a low level in the initial period.

Figure 2B:
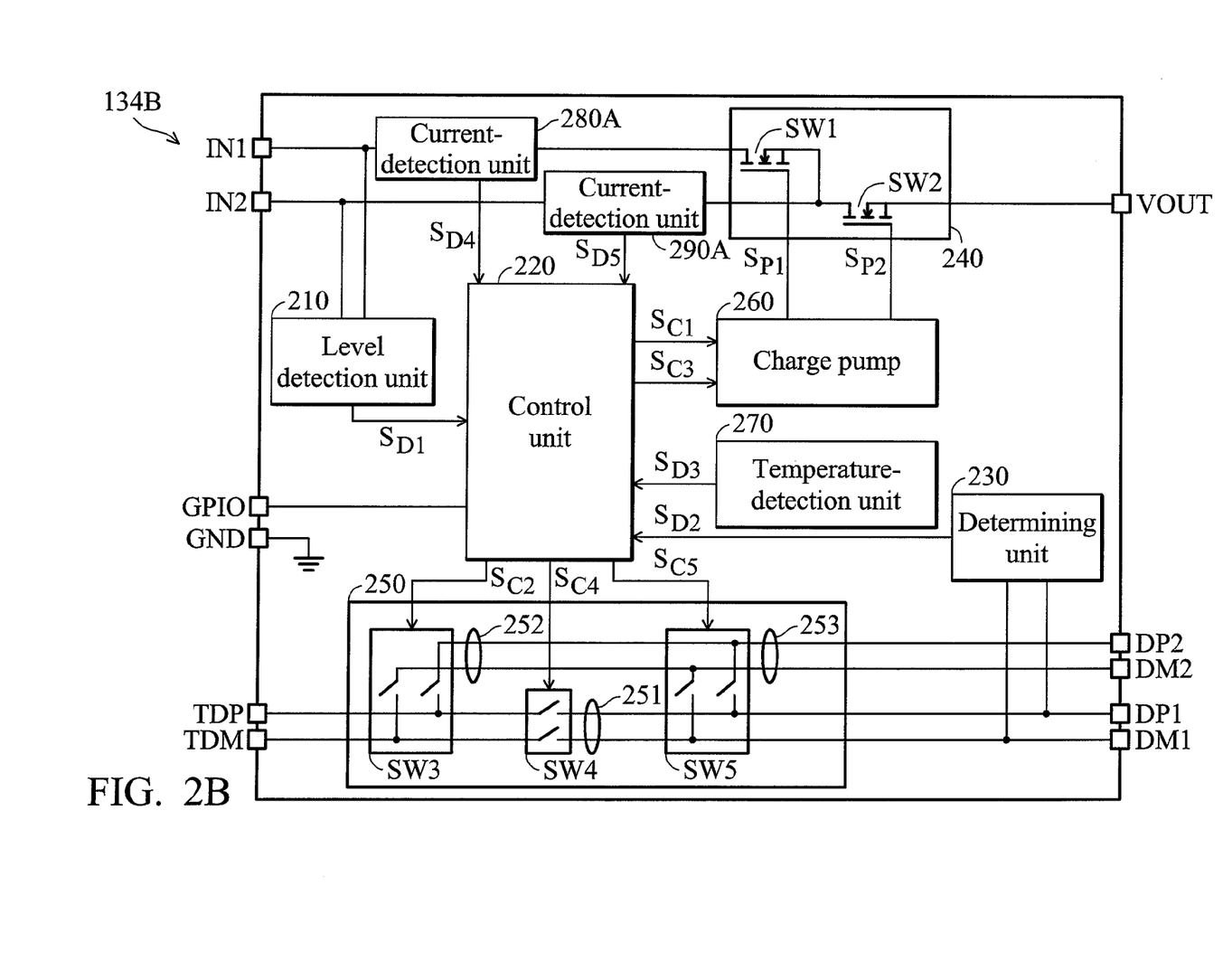

FIG. 2B is a schematic diagram of an exemplary embodiment of a control chip, in accordance with some embodiments. FIG. 2B is similar to FIG. 2A with the exception that the control chip 134B further includes a charge pump 260, a temperature-detection unit 270, and current-detection units 280A and 290A. In this embodiment, the switch unit 240 includes transistors SW1 and SW2. To control the transistors SW1 and SW2, the control unit 220 generates control signals $S_{C1}$ and $S_{C3}$ and provides the control signals $S_{C1}$ and $S_{C3}$ to the charge pump 260. The charge pump 260 enhances the driving capacity of the control signals $S_{C1}$ and $S_{C3}$ and the enhanced signals are referred to as the driving signals $S_{P1}$ and $S_{P2}$. The driving signals $S_{P1}$ and $S_{P2}$ turn on the transistors SW1 and SW2, respectively. When the transistor SW1 is turned on and the transistor SW2 is turned off, the host device 110 charges the electronic device 120. When the transistors SW1 and SW2 are turned on, the host device 110 charges the peripheral device 140. When the transistor SW2 is turned on and the transistor SW1 is turned off, the electronic device 120 charges the peripheral device 140. In some embodiments, when the transistors SW1 and SW2 are replaced with P-type transistors, the charge pump 260 can be omitted. In this case, the control signals $S_{C1}$ and $S_{C2}$ generated by the control unit 220 can directly drive the P-type transistors.

The temperature-detection unit 270 generates a detection result $S_{D3}$ according to the internal temperature of the control chip 134B. The current-detection unit 280A detects the current of the path 241 to generate a detection result $S_{D4}$. The current-detection unit 290A detects the current of the path 243 to generate a detection result $S_{D5}$. The control unit 220 generates the control signals $S_{C1}$ and $S_{C2}$ according to the detection results $S_{D1}$, $S_{D3}$~$S_{D5}$ and the determination result $S_{D2}$. For example, when the internal temperature of the control chip 134B is too high or the current of the path 241 or 243 is too large, the control unit 220 stops transmitting power and data between the host device 110, the electronic device 120 and the peripheral device 140 to ensure the safety of the control chip 134B.

In this embodiment, the switch unit 250 includes switches SW3~SW5. The switches SW3~SW5 are configured to turn on the paths 251~253 according to the control signals $S_{C2}$, $S_{C4}$ and $S_{C5}$. When the switch SW4 is turned on, the host device 110 communicates with the electronic device 120 via the path 251. When the switch SW3 is turned on, the host device 110 communicates with the peripheral device 140 via the path 252. When the switch SW5 is turned on, the electronic device 120 communicates with the peripheral device 140 via the path 253.

Figure 2C:
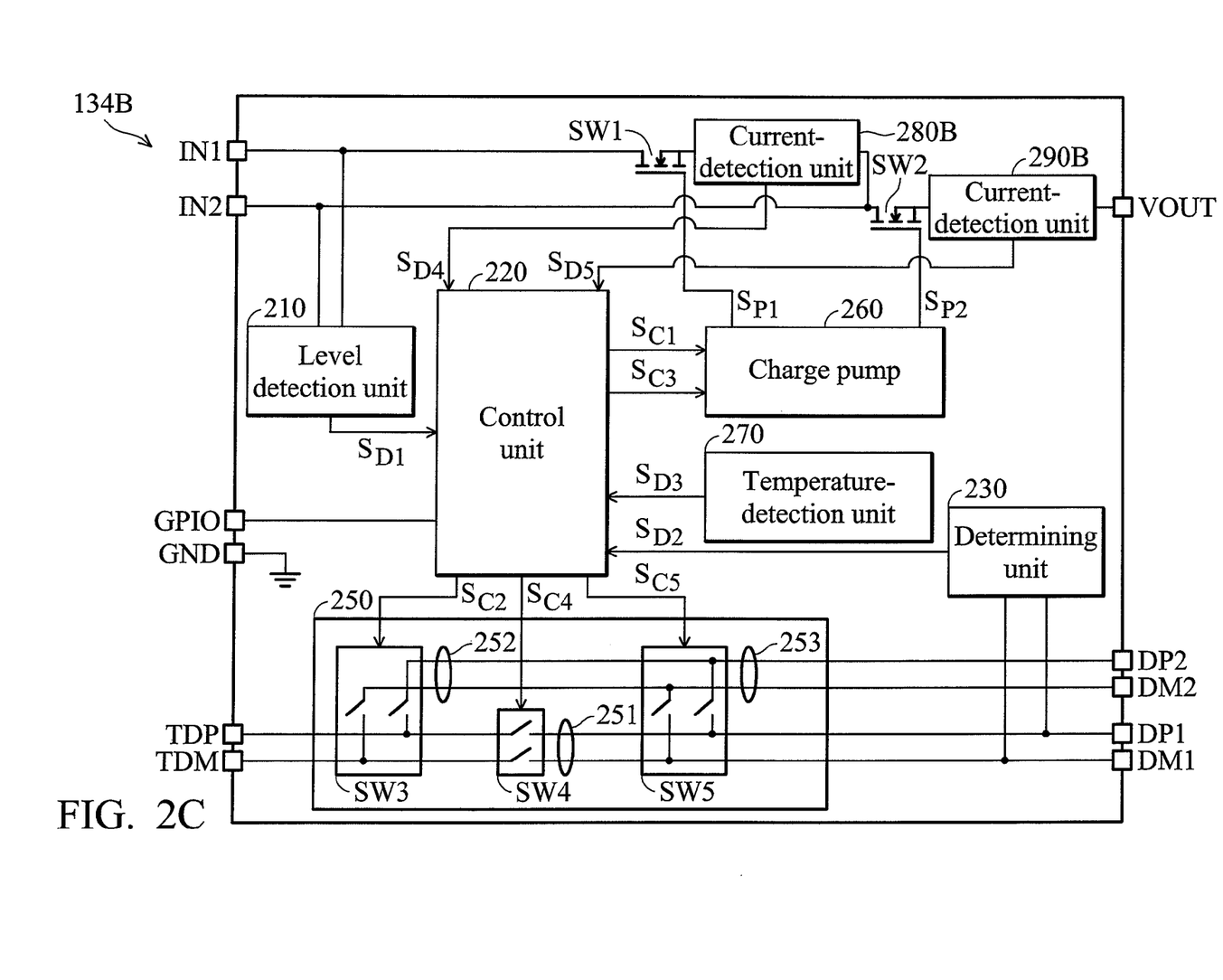

FIG. 2C is a schematic diagram of another exemplary embodiment of a control chip, in accordance with some embodiments. FIG. 2C is similar to FIG. 2B with the exception that the positions of the current-detection units 280B and 290B shown in FIG. 2C are different from the positions of the current-detection units 280A and 290A shown in FIG. 2B.

Figure 3A:
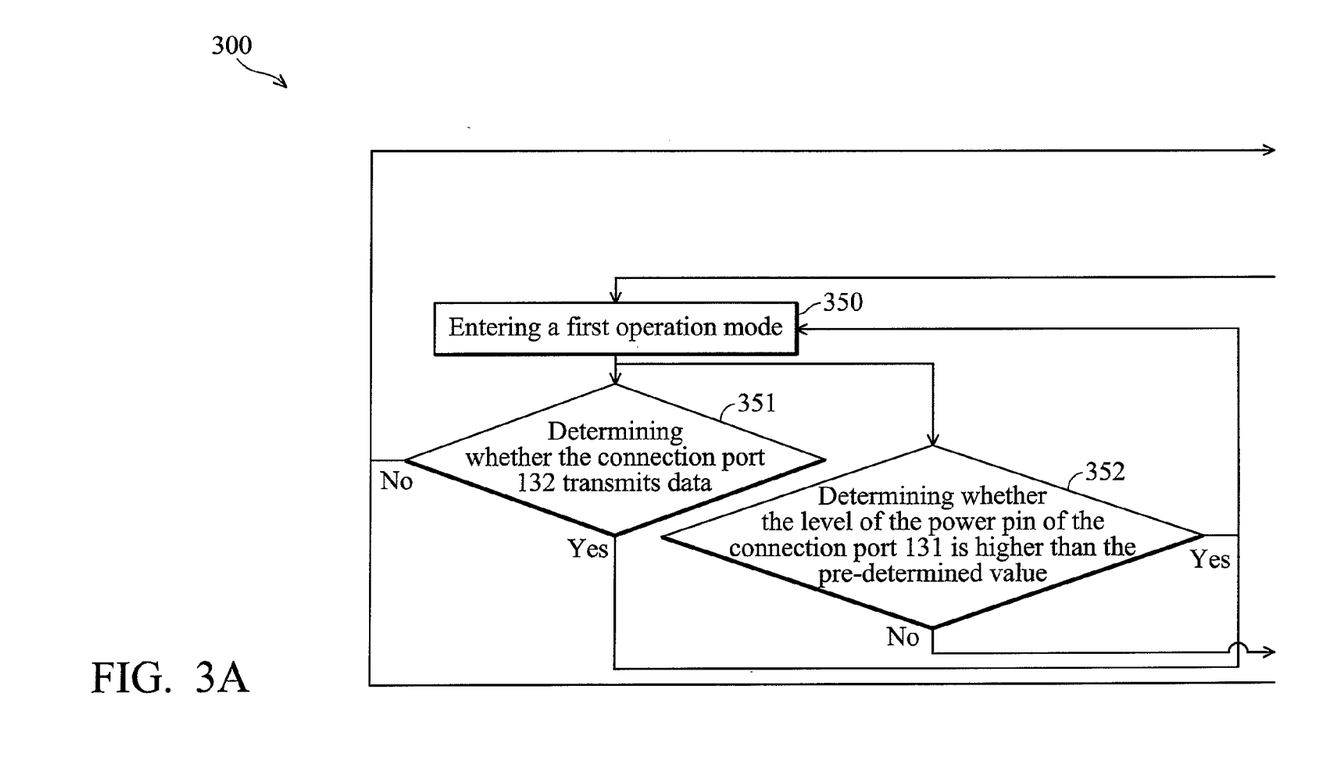
FIGS. 3A-3C and 4A-4C are schematic diagrams of exemplary embodiments of a control method, in accordance with some embodiments.
Figure 3B:
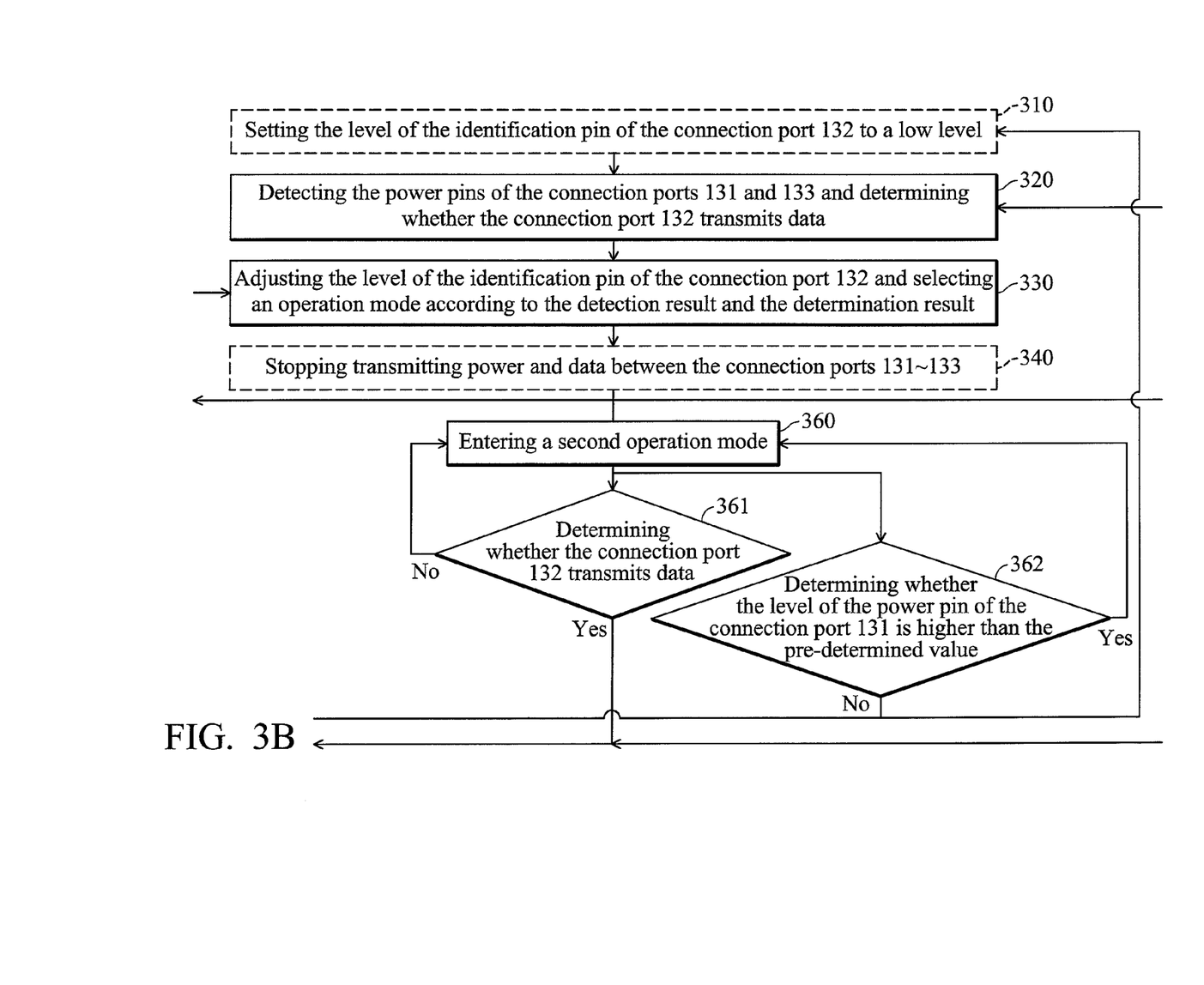
Figure 3C:
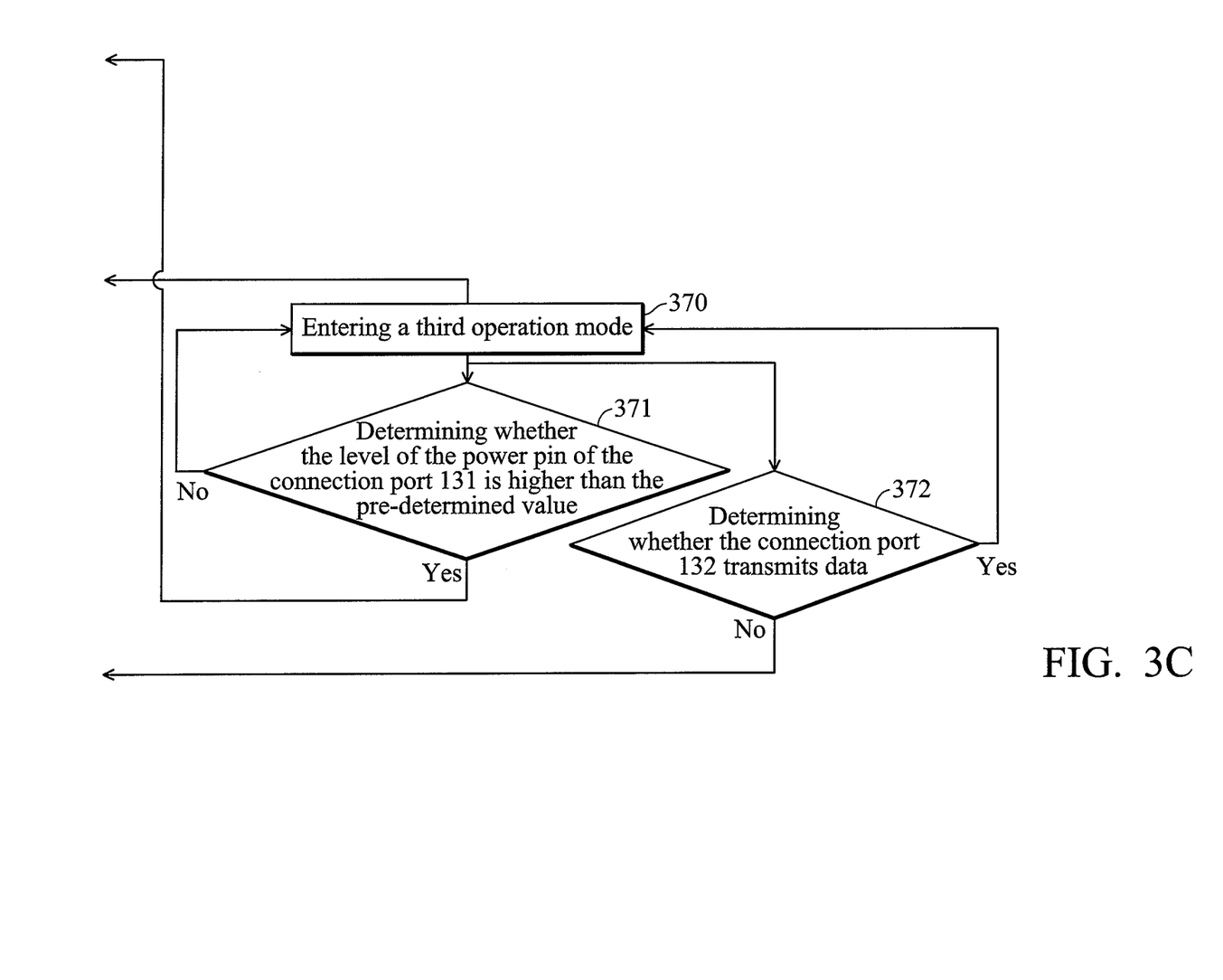

FIGS. 3A-3C are flowcharts of an exemplary embodiment of a control method, in accordance with some embodiments. The control method 300 can be applied in a connection device including a first connection port, a second connection port and a third connection port. The first connection port is coupled to a host device. The second connection port is coupled to an electronic device. The third connection port is coupled to the peripheral device. For clarity, the transmittal system 100 is taken as an example.

Refer to FIGS. 1, 3A-3C, the level of the identification pin of the connection port 132 is set to a low level (step 310). If the electronic device 120 has an OTG function, when the level of the identification pin is at the low level, the electronic device 120 enters a host mode. In another embodiment, step 310 can be omitted.

Next, the power pins of the connection ports 131 and 132 are detected and it is determined whether the connection port 132 transmits data (step 320). In one embodiment, when the host device 110 is coupled to the connection port 131 and the electronic device 120 with the OTG function is coupled to the connection port 132, the levels of the power pins of the connection ports 131 and 132 exceed a pre-determined value. Therefore, the connection status of the connection ports 131 and 132 are obtained according to the detection of the connection ports 131 and 132. However, when the electronic device 120 does not have the OTG function, the detection of the levels of the power pins of the connection port 132 cannot to determine whether the electronic device 120 is coupled to the connection port 132. Therefore, in another embodiment, the data transmittal of the connection port 132 is detected to determine whether the electronic device 120 is coupled to the connection port 132. For example, when the electronic device 120 is coupled to the connection port 132, the levels of the data pins of the connection port 132 are changed. When the electronic device 120 is not coupled to the connection port 132, the levels of the data pins of the connection port 132 are not changed.

The level of the identification pin of the connection port 132 is adjusted and an operation mode is selected according to the detection result and the determination result (step 330). Then, power and data between the connection ports 131~133 are stopped (step 340). In one embodiment, the stop time is approximately 500 ms. Step 340 can be omitted.

In a condition that the level of the power pin of the connection port 131 is higher than a pre-determined value, when the level of the power pin of the connection port 132 is higher than the pre-determined value or when data pins of the connection port 132 transmit data, it means that the host device 110 is coupled to the connection port 131 and the electronic device 120 is coupled to the connection port 132. Therefore, a first operation mode is entered (step 350). In the first operation mode, the level of the identification pin of the connection port 132 is set to a first level such that the electronic device 120 enters a device mode and is controlled by the host device 110. In this embodiment, the host device 110 provides power to the electronic device 120 and communicates with the electronic device 120.

Next, the level of the power pin of the connection port 131 is detected (step 352) and it is determined whether the connection port 132 transmits data (step 351). If the level of the power pin of the connection port 131 is still higher than the pre-determined value, step 350 is executed and the first operation mode is activated. Similarly, if the connection port 132 still transmits data, step 350 is executed such that the electronic device 120 operates in the device mode. The invention does not limit the sequence of steps 351 and 352. Step 351 may be before or after step 352. In another embodiment, steps 351 and 352 are executed simultaneously.

When the level of the power pin of the connection port 131 is not higher than the pre-determined value, it means that the host device 110 is not coupled to the connection port 131. Therefore, step 310 is executed to set the level of the identification pin of the connection port 132 to the low level and the levels of the power pins of the connection ports 131 and 132 are detected again. When the connection port 132 does not transmit data, it means that the electronic device 120 is not coupled to the connection port 132. Therefore, step 330 is executed to again select the operation mode according to the connection statuses of the connection ports 131~132.

In another embodiment, the priority of step 352 is higher than the priority of step 351. Therefore, while executing step 351, if the level of the power pin of the connection port 131 is not higher than the pre-determined value, step 310 is executed and step 351 is not continuously executed.

In a condition that the level of the power pin of the connection port 131 is higher than the pre-determined value, when the level of the power pin of the connection port 132 is not higher than the pre-determined value or when the data pins of the connection port 132 do not transmit data, it means that the host device 110 is coupled to the connection port 131 and the electronic device 120 is not coupled to the connection port 132. Therefore, a second operation mode is entered (step 360). In the second operation mode, since the electronic device 120 is not coupled to the connection port 132, the level of the identification pin of the connection port 132 can not be controlled. The level of the identification pin of the connection port 132 may be any level, such as the first level or the second level. In the second operation mode, when the peripheral device 140 is coupled to the connection port 133, the host device 110 provides power to the peripheral device 140 and communicates with the peripheral device 140.

In the second operation mode, it is determined whether the connection port 132 transmits data (step 361) and the level of the power pin of the connection port 131 is detected to determine whether the level of the power pin of the connection port 131 is still higher than the pre-determined value (step 362). When the connection port 132 does not transmit data, it means the electronic device 120 is not coupled to the connection port 132. Therefore, step 360 is executed to operate in the second operation mode. Furthermore, when the level of the power pin of the connection port 131 is higher than the pre-determined value, step 360 is executed. When the connection port 132 transmits data, it means that the electronic device 120 is coupled to the connection port 132. Therefore, step 330 is executed to select the operation mode according to the connection statuses of the connection ports 131~132. When the level of the power pin of the connection port 131 is not higher than the pre-determined value, it means that the host device 110 is not coupled to the connection port 131. Therefore, step 310 is executed to reset the level of the identification pin of the connection port 132 into the low level and again detect the levels of the power pins of the connection ports 131 and 132. The invention does not limit the sequence of steps 361 and 362. Step 361 may be before or after step 362. In another embodiment, steps 361 and 362 are executed simultaneously.

When the level of the power pin of the connection port 131 is not higher than the pre-determined value, if the level of the power pin of the connection port 132 is higher than the pre-determined value or the connection port 132 transmits data, it means that the host device 110 is not coupled to the connection port 131 and the electronic device 120 is coupled to the connection port 132. Therefore, a third operation mode is entered (step 370). During the third operation mode, the level of the identification pin of the connection port 132 is set to the low level, and the electronic device 120 enters a host mode. At this time, if the peripheral device 140 is coupled to the connection port 133, the electronic device 120 provides power to the peripheral device 140 and communicates with the peripheral device 140.

Next, the level of the power pin of the connection port 131 is detected to determine whether the level of the power pin of the connection port 131 is higher than the pre-determined value (step 371) and it is determined whether the connection port 132 transmits data (step 372). When the level of the power pin of the connection port 131 is not higher than the pre-determined value or the connection port 132 transmits data, step 370 is executed. When the level of the power pin of the connection port 131 is higher than the pre-determined value, it means that the host device 110 is coupled to the connection port 131. Therefore, step 320 is executed to detect the levels of the connection ports 131 and 132 and determine whether the connection port 132 transmits data again. If the connection port 132 does not transmit data, it means that the electronic device 120 is not coupled to the connection port 132. Therefore, step 330 is executed to select the operation mode according to the connection statuses of the connection ports 131 and 132. The invention does not limit the sequence of steps 371 and 372. Step 371 may be before or after step 372. In another embodiment, steps 371 and 372 are executed simultaneously.

Figure 4A:
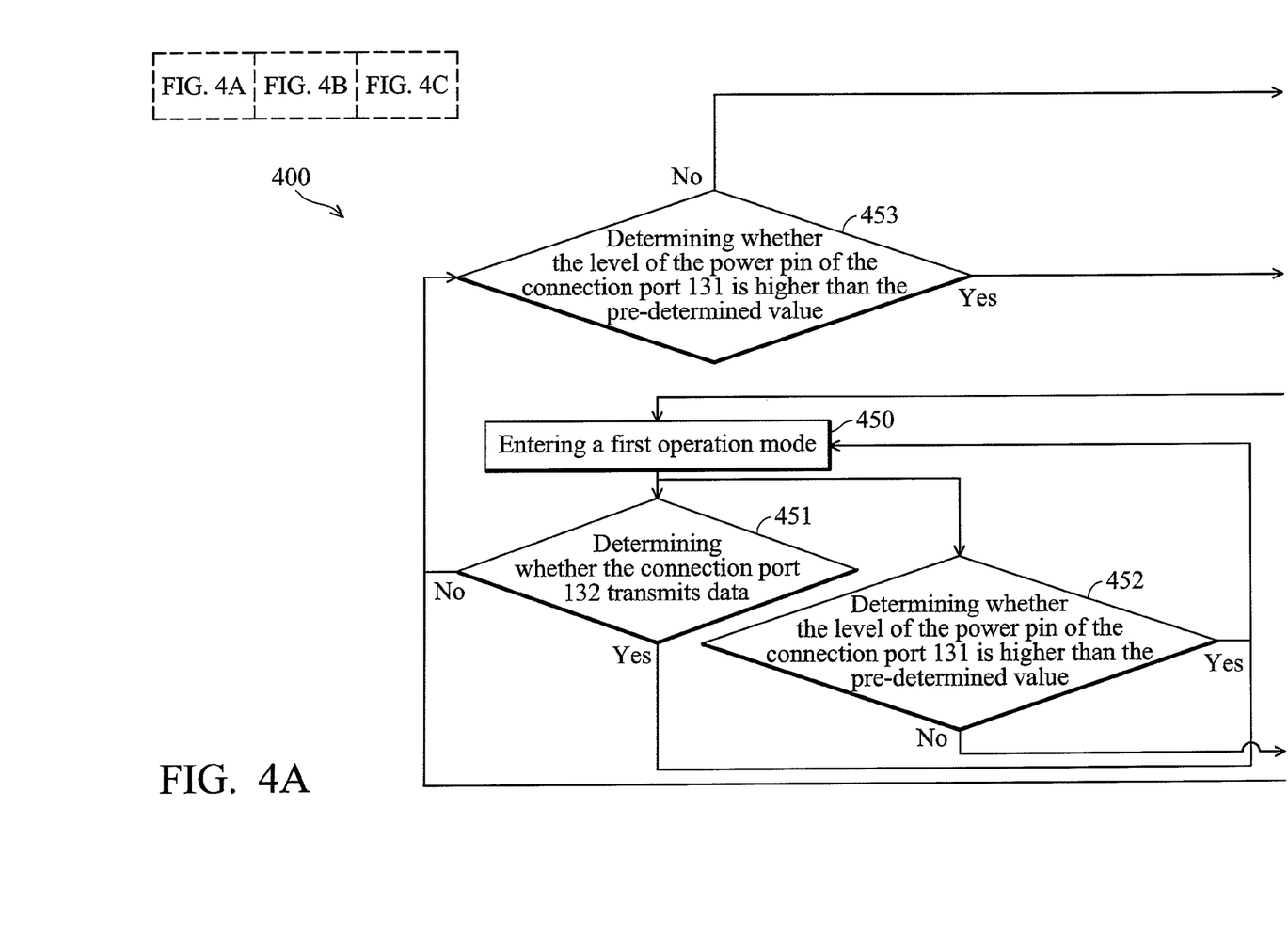
Figure 4B:
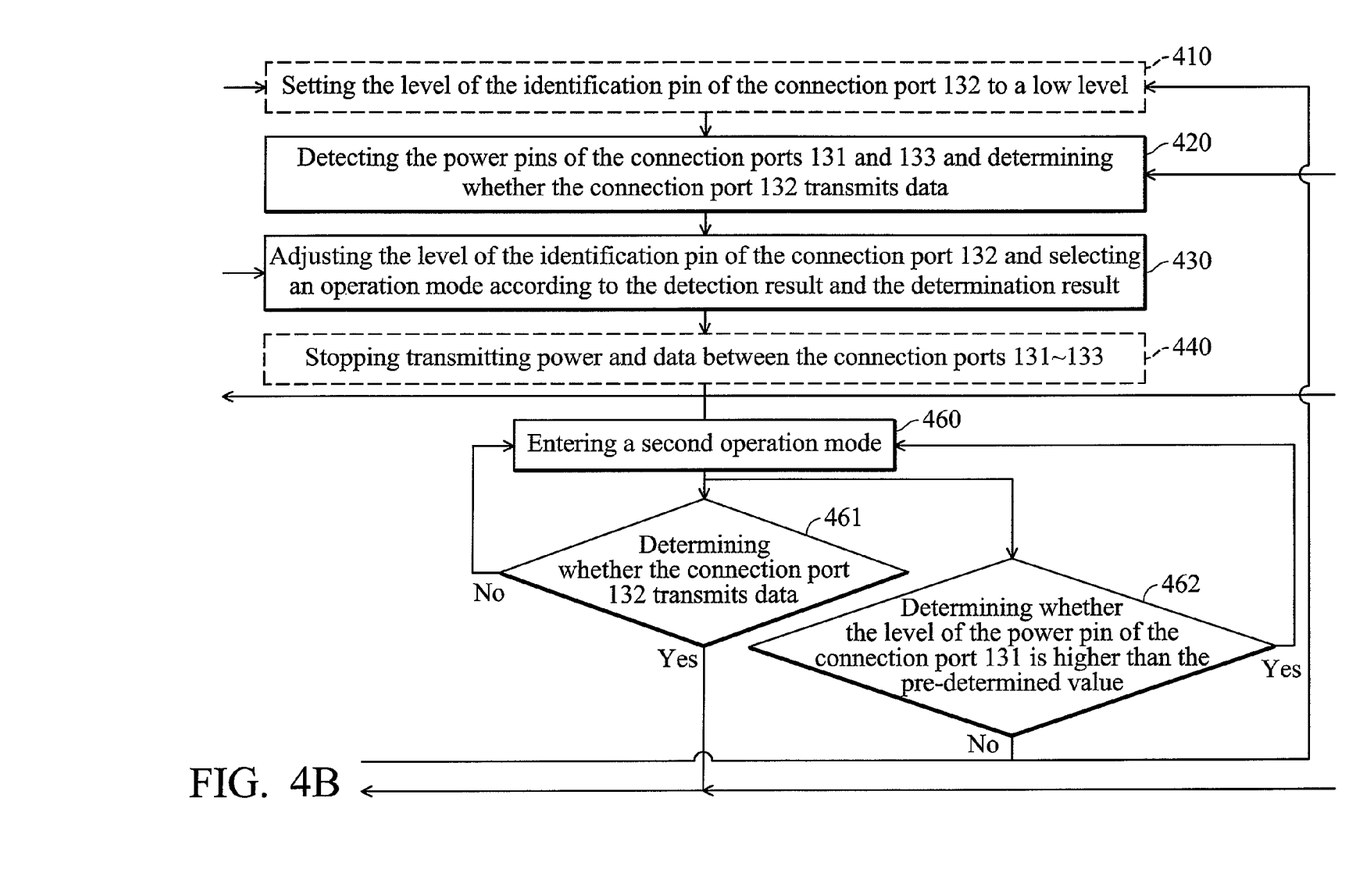
Figure 4C:
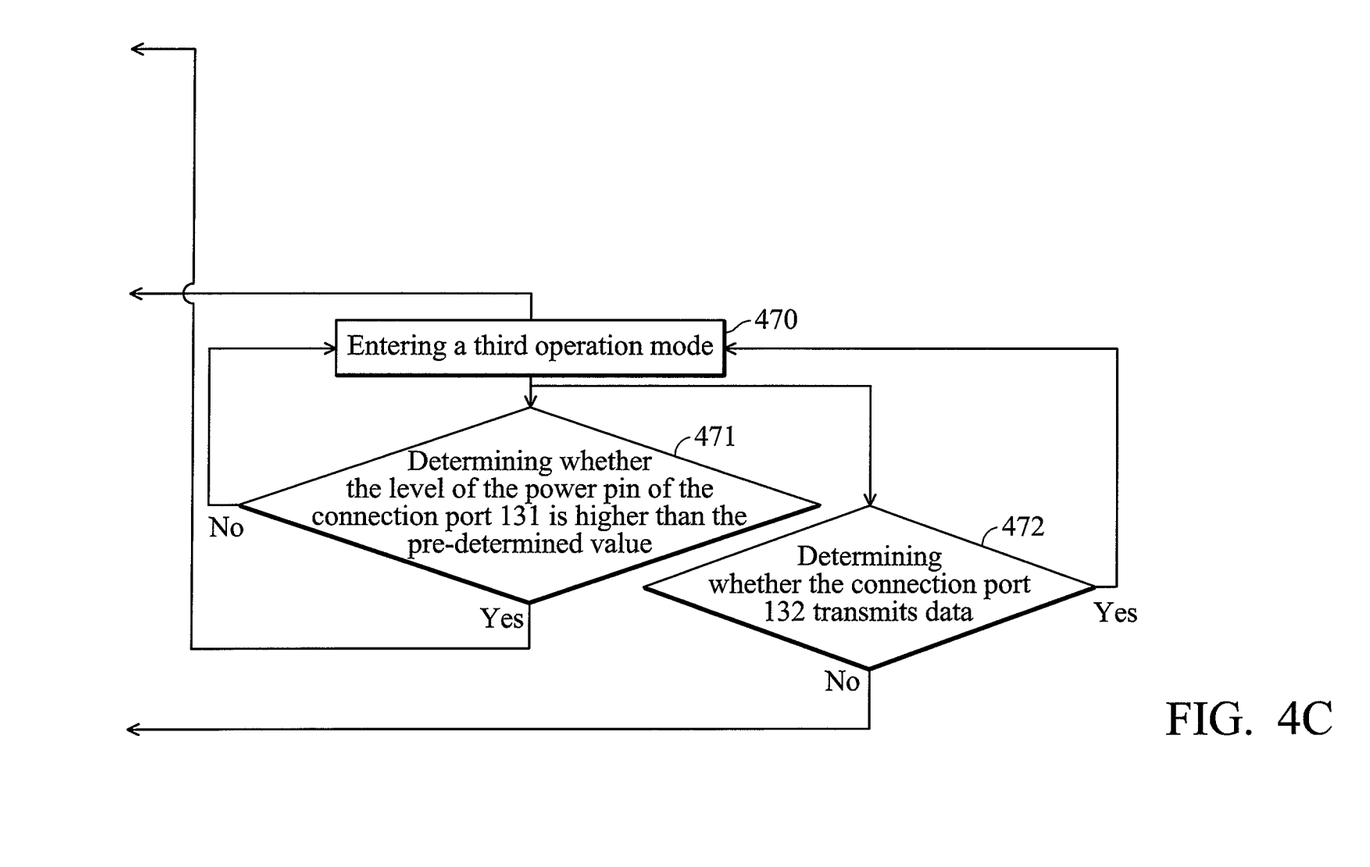

FIGS. 4A-4C are schematic diagrams of an exemplary embodiment of a control method, in accordance with some embodiments. FIGS. 4A-4C are similar to FIGS. 3A-3C except for the first operation mode. Refer to FIGS. 4A-4C, in the first operation mode, when the connection port 132 does not transmit data, the level of the power pin of the connection port 131 is detected to determine whether the level is higher than the pre-determined value (step 453). When the level of the power pin of the connection port 131 is higher than the pre-determined value, step 430 is executed. When the level of the power pin of the connection port 131 is not higher than the pre-determined value, step 410 is executed. Since other steps in FIGS. 4A-4C are the same as steps in FIGS. 3A-3C, the descriptions of other steps in FIGS. 4A-4C are omitted.

The connection statuses of the connection ports 131-132 are obtained according to the levels of the pins of the connection ports 131-132. The corresponding paths are turned on according to the obtained result to communicate with two devices, such as the host device 110 and the electronic device 120, the host device 110 and the peripheral device 140 or the electronic device 120 and the peripheral device 140. Therefore, the convenience of the transmittal system is increased.

In addition, when the host device 110 is coupled to the connection port 131, the electronic device 120 is coupled to the connection port 132 and the peripheral device 140 is coupled to the connection port 133, a pre-determined parameter is retrieved and power and data are transmitted between the host device 110 and the electronic device 120, between the host device 110 and the peripheral device 140 or between the electronic device 120 and the peripheral device 140 according to the pre-determined parameter.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control chip, comprising:
   a plurality of first pins coupled to a host device via a first connection port;
   a plurality of second pins coupled to an electronic device via a second connection port;
   a plurality of third pins coupled to a peripheral device via a third connection port;
   a level detection unit detecting the first and second pins to generate a first detection result;
   a determining unit determining whether a portion of the first and second pins transmit data to generate a determination result; and
   a control unit, configured to enable the host device to charge the electronic device when the control unit sets a level of a specific pin among the second pin to a first level according to the first detection result and the determination result, and configured to enable the electronic device or the host device to charge the peripheral device when the control unit sets the level of the specific pin to a second level different from the first level according to the first detection result and the determination result.

2. The control chip as claimed in claim 1, wherein the first pins comprise a first power pin, a first data pin, and a second data pin; the second pins comprise a second power pin, a third data pin, a fourth data pin, and the specific pin; the third pins comprise a third power pin, a fifth data pin, and a sixth data pin; and the control unit adjusts the level of the specific pin to control a level of an identification pin of the second connection port, the level detection unit detects the levels of the first and second power pins, and the determining unit determines whether the third and fourth data pins transmit data.

3. The control chip as claimed in claim 2, wherein in a condition that the level of the first power pin is higher than a pre-determined value, when the level of the second power pin is higher than the pre-determined value or the third and fourth data pins transmit data, the control unit sets the level of the specific pin to the first level and the host device provides power to the electronic device.

4. The control chip as claimed in claim 2, wherein in a condition that the level of the first power pin is higher than a pre-determined value, when the level of the second power pin is not higher than the pre-determined value or the third and fourth data pins do not transmit data, the control unit sets the level of the specific pin to the second level and the host device provides power to the peripheral device.

5. The control chip as claimed in claim 2, wherein in a condition that the level of the first power pin is not higher than a pre-determined value, when the level of the second power pin is higher than the pre-determined value or the third and fourth data pins transmit data, the control unit sets the level of the specific pin to the second level and the electronic device provides power to the peripheral device.

6. The control chip as claimed in claim 2, further comprising:

a first switch unit turning on a first path, a second path or a third path according to a first control signal, wherein the first path is coupled between the first and second power pins, the second path is coupled between the first and third power pins, and the third path is coupled between the second and third power pins; and a second switch unit turning on a fourth path, a fifth path or a sixth path according to a second control signal, wherein the fourth path is coupled to the first, second, third and fourth data pins, the fifth path is coupled to the first, second, fifth and sixth data pins, and the sixth path is coupled to the third, fourth, fifth and sixth data pins;

wherein in a condition that the level of the first power pin is higher than a pre-determined value, when the level of the second power pin is higher than the pre-determined value or when the third and fourth data pins transmit data, the first and fourth paths are turned on, wherein in a condition that the level of the first power pin is higher than the pre-determined value, when the level of the second power pin is not higher than the pre-determined value or when the third and fourth data pins do not transmit data, the second and fifth paths are turned on, wherein in a condition that the level of the first power pin is not higher than the pre-determined value, when the level of the second power pin is higher than the pre-determined value or when the third and fourth data pins transmit data, the third and sixth paths are turned on, wherein the control unit generates the first and second control signals according to the first detection result and the determination result.

7. The control chip as claimed in claim 6, wherein in an initial period, the first, second, third, fourth, fifth and sixth paths are not turned on, and after a period of time, the first and second switch units turn on the corresponding path according to the first and second control signals respectively.

8. The control chip as claimed in claim 6, further comprising:
a first current-detection unit detecting current on the first path to generate a second detection result;
a second current-detection unit detecting current on the third path to generate a third detection result; and
a temperature-detection unit generating a fourth detection result according to temperature of the control chip,
wherein the control unit generates the first and second control signals according to the second, third and fourth detection results.

9. A control method for a connection device comprising a first connection port coupled to a host device, a second connection port coupled to an electronic device and a third connection port coupled to a peripheral device, comprising:
detecting power pins of the first and second connection ports to generate a detection result;
determining whether the second connection port transmits data to generate a determination result; and
adjusting a level of an identification pin of the second connection port according to the detection result and the determination result, wherein when the level of the identification pin is adjusted to a first level, the host device is enabled to charge the electronic device, and when the level of the identification pin is adjusted to a second level different from the first level, the electronic device or the host device is enabled to charge the peripheral device.

10. The control method as claimed in claim 9, wherein in a condition that the level of the power pin of the first connection port is higher than a pre-determined value, when the level of the power pin of the second connection port is higher than the pre-determined value or when the data pins of the second connection port transmit data, the level of the identification pin is set to the first level and power of the host device is provided to the electronic device.

11. The control method as claimed in claim 9, wherein in a condition that the level of the power pin of the first connection port is higher than a pre-determined value, when the level of the power pin of the second connection port is not higher than the pre-determined value or when the data pins of the second connection port do not transmit data, the level of the identification pin is set to the second level and the power of the host device is provided to the peripheral device.

12. The control method as claimed in claim 9, wherein in a condition that the level of the power pin of the first connection port is not higher than a pre-determined value, when the level of the power pin of the second connection port is higher than the pre-determined value or when the data pins of the second connection port transmit data, the level of the identification pin is set to the second level and power of the electronic device is provided to the peripheral device.

13. A connection device comprising:
a first connection port configured to couple to a host device;
a second connection port configured to couple to an electronic device;
a third connection port configured to couple to a peripheral device; and
a control chip comprising:
a plurality of first pins coupled to the first connection port;
a plurality of second pins coupled to the second connection port;
a plurality of third pins coupled to the third connection port;
a level detection unit detecting the first and second pins to generate a first detection result;
a determining unit determining whether the second connection port is coupled to the second pins to generate a determination result; and
a control unit, configured to enable the host device to charge the electronic device when the control unit sets a level of a specific pin among the second pin to a first level according to the first detection result and the determination result, and configured to enable the electronic device or the host device to charge the peripheral device when the control unit sets the level of the specific pin to a second level different from the first level according to the first detection result and the determination result.

14. The connection device as claimed in claim 13, wherein the first pins comprise a first power pin, a first data pin, and a second data pin; the second pins comprise a second power pin, a third data pin, a fourth data pin, and the specific pin; the third pins comprise a third power pin, a fifth data pin, and a sixth data pin; and the control unit adjusts the level of the specific pin to control a level of an identification pin of the second connection port, the level detection unit detects the levels of the first and second power pins, and the determining unit determines whether the third and fourth data pins transmit data.

15. The connection device as claimed in claim 13, wherein in a condition that the level of the first power pin is higher than a pre-determined value, when the level of the second power pin is higher than the pre-determined value or when the third and fourth data pins transmit data, the control unit sets the level of the specific pin to the first level and the host device provides power to the electronic device.

16. The connection device as claimed in claim 13, wherein in a condition that the level of the first power pin is higher than a pre-determined value, when the level of the second power pin is not higher than the pre-determined value or when the third and fourth data pins do not transmit data, the control unit sets the level of the specific pin to the second level and the host device provides power to the peripheral device.

17. The connection device as claimed in claim 13, wherein in a condition that the level of the first power pin is not higher than a pre-determined value, when the level of the second power pin is higher than the pre-determined value or when the third and fourth data pins transmit data, the control unit sets the level of the specific pin to the second level and the electronic device provides power to the peripheral device.

18. The connection device as claimed in claim 14, further comprising:
- a first switch unit turning on a first path, a second path or a third path according to a first control signal, wherein the first path is coupled between the first and second power pins, the second path is coupled between the first and third power pins, and the third path is coupled between the second and third power pins; and
- a second switch unit turning on a fourth path, a fifth path or a sixth path according to a second control signal, wherein the fourth path is coupled to the first, second, third and fourth data pins, the fifth path is coupled to the first, second, fifth and sixth data pins, and the sixth path is coupled to the third, fourth, fifth and sixth data pins;

wherein in a condition that the level of the first power pin is higher than a pre-determined value, when the level of the second power pin is higher than the pre-determined value or when the third and fourth data pins transmit data, the first and fourth paths are turned on, wherein in a condition that the level of the first power pin is higher than the pre-determined value, when the level of the second power pin is not higher than the pre-determined value or when the third and fourth data pins do not transmit data, the second and fifth paths are turned on, wherein in a condition that the level of the first power pin is not higher than the pre-determined value, when the level of the second power pin is higher than the pre-determined value or when the third and fourth data pins transmit data, the third and sixth paths are turned on, wherein the control unit generates the first and second control signals according to the first detection result and the determination result.

19. The connection device as claimed in claim 18, wherein in an initial period, the first, second, third, fourth, fifth and sixth paths are not turned on, after a period of time, the first and second switch units turn on the corresponding path according to the first and second control signals respectively.

20. The connection device as claimed in claim 18, further comprising:
- a first current-detection unit detecting current on the first path to generate a second detection result;
- a second current-detection unit detecting current on the third path to generate a third detection result; and
- a temperature-detection unit generating a fourth detection result according to temperature of the control chip, wherein the control unit generates the first and second control signals according to the second, third and fourth detection results.

* * * * *